HENRY EDDY.
Improvement in Cribs for Horses.
No. 4,405. Reissued May 30, 1871.
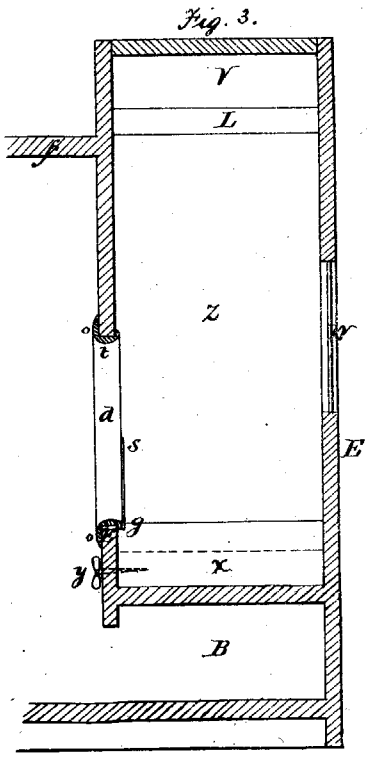
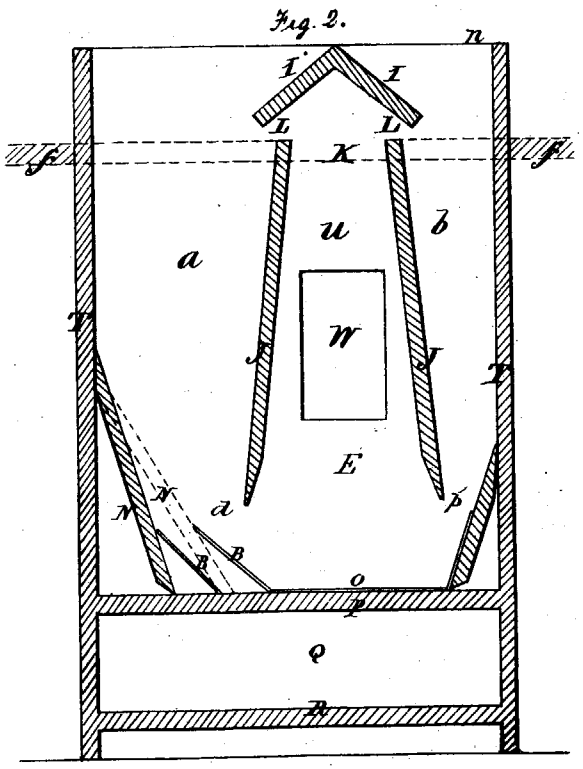
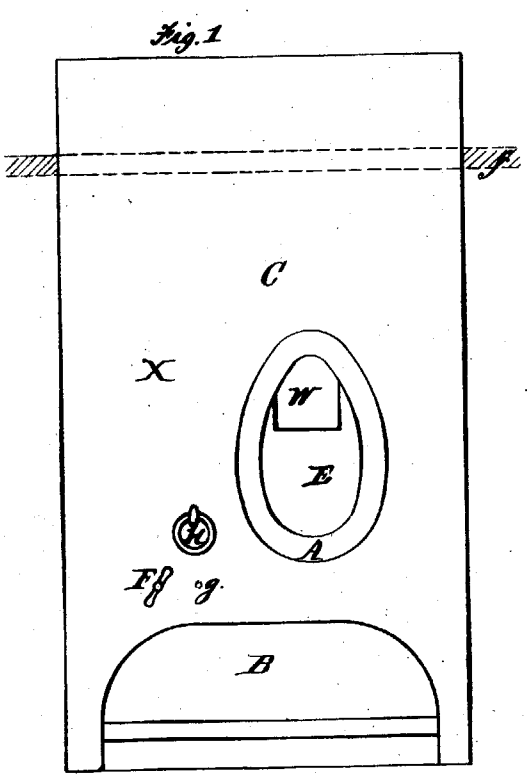
Inventor.
Henry Eddy
Witnesses.
Samuel T. Howard
J. H. Eddy
AM. PHOTO-LITHOGRAPHIC CO. N.Y. (OSBORNE'S PROCESS.)

UNITED STATES PATENT OFFICE.

HENRY EDDY, OF NORTH BRIDGEWATER, MASSACHUSETTS.

IMPROVEMENT IN CRIBS FOR HORSES.

Specification forming part of Letters Patent No. 36,287, dated August 26, 1862; reissue No. 4,405, dated May 30, 1871.

*To all whom it may concern:*

Be it known that I, HENRY EDDY, of North Bridgewater, in the county of Plymouth, in the State of Massachusetts, have invented a new and useful Improvement in the Mode of Constructing Cribs for Horses, patented to me January 6, 1857, and reissued April 8, 1862; and I do hereby declare that the following is a full and exact description thereof, reference being had to the accompanying drawing and to the letters of reference marked thereon.

Of the said drawing, Figure 1 denotes a front view of the crib; Fig. 2, a vertical and longitudinal section; Fig. 3, a vertical and transverse section.

My design is to construct a crib or manger in such a manner as to combine great simplicity, neatness, economy, and durability, and thus obviate most of the difficulties which have hitherto existed in the feeding of horses.

In carrying out my invention I dispense with the rack and shallow manger which are in common use, and construct the crib C, Fig. 1, in the following manner: The crib which is represented in the drawing consists, in part, of a box, as its external case, which has four sides, E X T T, united together. The partition or boarding E constitutes the front side of the crib, as seen in Fig. 1. I usually construct the crib in such a manner that the boarding E constitutes a part of the wall or covering of the stable. The window *w* is inserted in the side E, as seen in Fig. 1, to accommodate the horse with light at all times and with fresh air in sultry weather. The partition or boarding X, as shown in Fig. 1, constitutes the rear side of the crib, which extends from the floor or bottom of the crib P to the upper floor *f*, and may, if desired, extend higher than the floor *f*, as shown in the drawing. An opening is made in the boarding X for inserting the head and neck of the horse, which is entirely encircled by a metallic collar. The metallic collar A, as seen in Fig. 1, is employed to protect the opening, which is made in the boarding X from the teeth of the horse, and to give additional strength and durability to the same. The lip or flange *t*, as seen in Fig. 3, covers the entire edge of said opening. The face *o* of said collar, as seen in Fig. 3, covers the entire margin of the opening. Said metallic collar may be made in separate sections and so used; and, if desired, only a sectional part may be used on that part of the boarding of a crib which is most exposed to the teeth of the horse, and subserve substantially the same purpose. The lip or flange *t* may be omitted without destroying its utility, especially when it is used, as it may be, for other animals than horses. H, as seen upon the boarding X in Fig. 1, is a ring, to which a horse may be tied. The space B, as seen in Fig. 1, beneath the crib, is for the purpose of storing the bedding of the horse. The bottom or floor of the crib P, as seen in Fig. 2, is covered with a metallic plate, *o*, to keep the same sweet and clean, and to protect the same from the teeth of the horse. T T, as seen in Fig. 2, are ends of the crib or partitions, which may separate the same from adjacent cribs. Said ends or partitions extend from the floor upon which the horse stands, as seen at R in Fig. 2, to the line *n* above the floor *f*. Said partitions may extend no further than the floor, as seen in the drawing. The inclined planes J J, as seen in Fig. 2, are inserted between the front side E and the rear side X of the crib. Said inclined planes are employed to allow the food of the horse to descend without coming in contact with his head. These inclined planes partially inclose the space *u*, which may be occupied by the head of the horse when he is fed. Open spaces *a b*, as seen in Fig. 2, are formed, in part, by these inclined planes and the ends of the crib T T, through which the food may descend to the horse. A vertical opening, as seen at K in Fig. 2, is formed between these inclined planes, through which rarefied air, especially the breath of the horse, may escape. A triangular cap, composed of the sides I I, as seen in Fig. 2, is applied above the vertical opening K, which entirely spans said opening, to prevent the deposit of hay-seed and other matter upon the head of the horse. Open spaces L L are formed beneath said triangular caps for the escape of the breath of the horse. The inclined planes M N, as seen in Fig. 2, are inserted between the front side E and the rear side X of the crib, the object of which is to operate as regulators of the feed. Said inclined planes may be permanently attached to the bottom P and to the sides T T of the crib, or may be rendered movable, as seen in Fig. 2. When the incline N is rendered movable it is held in place by the screw F, as seen in Fig. 1. The space formed between the inclined plane N and the lower extremity of the inclined plane J, as seen at *d*, Fig. 2, is intended to constitute a delivery, through which the horse shall receive hay and other strawy matter.

By withdrawing the screw F the inclined plane N may be moved forward to occupy the position of the dotted line N, for the purpose of contracting the delivery *d*. When occupying this position it will be held in place by inserting the screw in the hole *g*, as seen in the Fig. 1.

The operation of the movable inclined plane N is to check or stop hay and other strawy matter at the point *d*, where it may be reached by the horse, or to render the opening *d* variable.

The space P between the inclined plane M and the lower extremity of the inclined plane J may be unobstructed for the delivery of grain to the horse; or, if desired, the inclined plane M may be rendered movable in like manner as the inclined plane N, already described. The lower parts of the inclined planes M N are covered by the metallic plates A B to protect the same from the teeth of the horse. The lower edges of these metallic plates rest against or impinge upon the extremities of the metallic plate *o*. The connection thus formed between these metallic plates and the metallic plate *o* has all the effect of a joint, and they may be placed at any desired angle with the metallic plate *o* to accommodate the position of the inclined planes M N.

The advantages of my invention may be stated as follows: First, the crib is one of great durability; second, it is abundantly ventilated; third, the horse is in no danger of becoming a cribber; fourth, he cannot waste a particle of his food; fifth, the head of the horse cannot be soiled with hay, seed, or other matter; sixth, the breath of the horse does not penetrate or ascend through a mass of hay, and thus render it unfit for use.

I claim nothing original in the construction of a deep crib or manger with an opening for inserting the head and neck of the horse, and nothing which was secured to me by Letters Patent of the United States bearing date January 6, 1857.

What I claim, and desire to secure by Letters Patent, is—

1. The metallic collar A, having substantially the configuration shown, to be applied as and for the purpose specified, substantially as described.

2. The adjustable feed-regulators M N forming, in conjunction with the inclined planes J J, the variable openings *d p*, substantially as described.

3. The plates B and *o*, connected and adjusted in the manner and for the purpose specified.

In testimony whereof I have set my hand this 26th day of January, 1871.

HENRY EDDY.

Witnesses:
DAVID L. COWELL,
SAMUEL F. HOWARD.